United States Patent
Pahl (10) Patent No.: US 10,194,227 B2
(45) Date of Patent: Jan. 29, 2019

(54) TOP PORT MICROPHONE AND METHOD FOR THE PRODUCTION OF SAME

(71) Applicant: TDK Corporation, Tokyo (JP)

(72) Inventor: Wolfgang Pahl, München (DE)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/746,202

(22) PCT Filed: Jun. 29, 2016

(86) PCT No.: PCT/EP2016/065193
§ 371 (c)(1),
(2) Date: Jan. 19, 2018

(87) PCT Pub. No.: WO2017/021068
PCT Pub. Date: Feb. 9, 2017

(65) Prior Publication Data
US 2018/0213311 A1     Jul. 26, 2018

(30) Foreign Application Priority Data

Jul. 31, 2015 (DE) .................... 10 2015 112 642

(51) Int. Cl.
*H04R 1/02* (2006.01)
*H04R 1/04* (2006.01)
(Continued)

(52) U.S. Cl.
CPC .......... *H04R 1/04* (2013.01); *B29C 44/1228* (2013.01); *B29C 44/3415* (2013.01);
(Continued)

(58) Field of Classification Search
CPC . H04R 1/02; H04R 1/021; H04R 1/04; H04R 1/34; H04R 19/04; H04R 19/005;
(Continued)

(56) References Cited

U.S. PATENT DOCUMENTS 3,615,972 A * 10/1971 Morehouse, Jr. ........ B01J 13/18
156/276
8,189,820 B2 * 5/2012 Wang ................... H04R 19/005
381/174
(Continued)

FOREIGN PATENT DOCUMENTS

DE      102004011148 B3    11/2005
DE      102006046292 A1     4/2008
(Continued)

OTHER PUBLICATIONS

International Search Report in corresponding International Application No. PCT/EP2016/065193, dated Oct. 5, 2016 (2 pages).
(Continued)

*Primary Examiner* — Jesse A Elbin
(74) *Attorney, Agent, or Firm* — Nixon Peabody LLP (57) ABSTRACT

A microphone having a housing including a bottom part and an upper part, and a transducer element which is arranged in the housing and is electrically and mechanically connected to the bottom part. For stress-free mounting of the transducer element, a flexible connecting element is proposed, which is pliable and/or compressible, is arranged between the transducer element and the upper part, and connects the transducer element to the upper part. The connecting element comprises a plastic, in which gas bubbles are distributed, the gas bubbles having a volume fraction of between 50 and 98% in the connecting element.

20 Claims, 3 Drawing Sheets

(51) Int. Cl.
*H04R 1/28* (2006.01)
*H04R 1/34* (2006.01)
*B29C 44/12* (2006.01)
*B29C 44/18* (2006.01)
*B29C 44/34* (2006.01)
*B29C 65/48* (2006.01)
*B29L 31/34* (2006.01)
*H04R 19/00* (2006.01)
*H04R 19/01* (2006.01)
*H04R 19/04* (2006.01)
*B29K 101/12* (2006.01)
*B29K 105/04* (2006.01)

(52) U.S. Cl.
CPC ............. *B29C 65/48* (2013.01); *H04R 1/021* (2013.01); *H04R 1/2811* (2013.01); *H04R 1/34* (2013.01); *H04R 19/005* (2013.01); *H04R 19/016* (2013.01); *H04R 19/04* (2013.01); *B29C 44/188* (2013.01); *B29K 2101/12* (2013.01); *B29K 2105/046* (2013.01); *B29K 2995/0097* (2013.01); *B29L 2031/34* (2013.01); *B29L 2031/3481* (2013.01); *H04R 2201/003* (2013.01); *H04R 2201/029* (2013.01)

(58) Field of Classification Search
CPC ............. H04R 19/016; H04R 2201/003; H04R 2201/029; B29C 44/3415; B29C 44/1228; B29C 44/188; B29C 65/48; B29L 2031/34; B29L 2031/3481; B29K 2105/046; B29K 2101/12; B29K 2995/0097

USPC ................. 381/91, 122, 175, 355, 360, 361; 257/254, 416, 419
See application file for complete search history.

(56) References Cited

U.S. PATENT DOCUMENTS

| 8,218,794 | B2 | 7/2012 | Pahl |
| 2017/0070825 | A1 | 3/2017 | Pahl |

FOREIGN PATENT DOCUMENTS

| DE | 102010026519 A1 | 1/2012 | |
| DE | 102011087963 A1 * | 6/2012 | ......... B81C 1/00269 |
| DE | 102011087963 A1 | 6/2012 | |
| DE | 102014106503 A1 | 11/2015 | |
| EP | 1690893 A1 | 8/2006 | |
| EP | 2804394 A1 | 11/2014 | |
| JP | 2004-208067 A | 7/2004 | |
| JP | 2006-153804 A | 6/2006 | |

OTHER PUBLICATIONS

Written Opinion in corresponding International Application No. PCT/EP2016/065193, dated Oct. 5, 2016 (6 pages) (English translation).
Wikipedia: "Schaumstoff," available at https://de.wikipedia.org/w/index.php?title=Schaumstoff&oldid=143441548, Jun. 6, 2015, 9 pages (with English translation).

* cited by examiner

TOP PORT MICROPHONE AND METHOD FOR THE PRODUCTION OF SAME

CROSS-REFERENCE TO RELATED APPLICATIONS

This application is a U.S. National Stage of International Application No. PCT/EP2016/065193, filed Jun. 29, 2016, which claims the benefit of Germany Patent Application No. 102015112642.7, filed Jul. 31, 2015, both of which are incorporated herein by reference in their entireties.

The present invention relates to a microphone and to a method for producing a microphone. It may, in particular, be a capacitor microphone, particularly in MEMS design. Such a microphone comprises a transducer element, which needs to be encapsulated in a package. In order to allow a good reception quality in such a microphone, a maximally large back volume is necessary, since the sensitivity of the microphone for the registering of pressure variations is improved by a large back volume. Furthermore, in such a microphone the outlay for the internal electrical interconnection should be kept small and the transducer element should be protected against mechanical stress.

Microphones may be configured in "top port" design. In this case, the sound inlet and external connections lie on opposite sides of the housing, or of the package. In one variant, the MEMS chip is arranged on the sound opening on the upper side of the package, which leads to a complicated internal construction and connection technique. As an alternative, the sound guiding from the inlet on the upper side to the MEMS chip may be provided on the lower side, which likewise can be achieved only with great outlay in terms of design.

DE 10 2004 011148 B3 discloses a microphone in which a microphone chip is encapsulated by means of a cover and a sound seal. The microphone chip is furthermore fastened on a substrate by means of a rigid fastening device. In this microphone, strong mechanical couplings occur both between the cover and the microphone chip and between the microphone chip and the substrate. The couplings may impair the functionality of the microphone chip and furthermore lead to a temperature-dependent behavior of the system.

Another microphone is disclosed by U.S. Pat. No. 8,218,794 B2. In this microphone, the microphone chip is fastened on the substrate by means of a spring and presses the microphone chip against the upper inner wall of the microphone housing, sealing of the sound opening being carried out, which is arranged in the upper part of the microphone housing.

In practice, both known solutions entail a series of problems. First, the MEMS chip is clamped on both sides between the upper part and the bottom part, which influences its characteristics by mechanical stress. Attempts are made to counteract this by using a soft adhesive, or by contact elements configured as springs. Another difficulty also consists in the tolerances of the chip thickness and chip mounting, the height of the internal space of the package and the height of the connecting gap between the upper part and the bottom part of the package, all of which contribute to indeterminability of the gap between the MEMS chip and the upper part, or cap. Furthermore, it is extraordinarily difficult to dimension the amount of connecting medium in such a way that, under all circumstances, all-round sealing of the sound entry channel takes place but flow of the connecting medium into the MEMS cavity is excluded.

It is an object of the present invention to provide an improved microphone, which overcomes at least one of the disadvantages mentioned above. It is another object of the present invention to provide a method for producing such a microphone.

The objects are achieved by a microphone according to present claim 1, and respectively by a method according to the second independent claim.

A microphone is provided, which is mounted in a two-part housing that comprises a bottom part and an upper part. A transducer element, i.e. the active part of the microphone, is arranged inside the housing and is electrically and mechanically connected to the bottom part.

For acoustic connection of the transducer element to the upper part, a connecting element is arranged between the transducer element and the upper part, which bears both on the transducer element and on the inner side of the upper part. The connecting element is configured to be flexible and in particular pliable with a relatively low E modulus. It comprises a plastic, in which free or encapsulated gas bubbles are distributed, which are produced by foaming. The amount of gas bubbles in the plastic is dimensioned in such a way that they have a volume fraction of between 50 and 98 percent in the connecting element. The connecting element in this case has a predominantly closed-cell foam structure. The foaming of the connecting element, or the production of the gas bubbles, is carried out first in the housing, so that the connecting element bears compression-free and tightly on the transducer element and upper part.

Because of the gas bubbles included, the connecting element according to the invention has a compressibility and a low E modulus, so that certain elasticity of the connecting element is achieved merely by means of this. The higher the volume fraction of the gas bubbles selected, the softer and more compressible the connecting element becomes.

If the plastic of the connecting element is too soft a polymer, it may have a linear thermal expansion coefficient at room temperature which is more than 1000 ppm/K. Preferably, the mechanical properties of the plastic are therefore selected in such a way that the thermal expansion coefficient of the plastic in the foamed state at room temperature is less than or equal to 300 ppm/K.

The plastic of the connecting element may comprise a plastic in which gas bubbles are distributed, and which is selected from a) or b):
  a) a thermoplastic having a softening temperature of between 100 and 220° C.
  b) a thermoset having a thermal expansion coefficient of less than or equal to 300 ppm/K at room temperature.

According to one embodiment, the plastic of the connecting element is a thermoplastic. This has the advantage that it has a softening point. This in turn makes it possible for the gas bubbles to be released only after the melting of the thermoelastic plastic, wherein the plastic can thus expand. By the expansion of the thermoplastic material, the gap between the transducer element and the upper part is reliably closed. The connecting element forms a good seal between the transducer element and the upper part.

The connecting element may, however, also be formed from a thermosetting plastic. If its curing temperature—with a given thermal curability—lies above the expansion temperature, the gas bubbles released can be contained firmly in the plastic matrix of the connecting element. If the plastic has a different curing mechanism, it may be cured temperature-independently after the expansion.

In one embodiment, a sound inlet is provided in the upper part and a sound opening is provided in the transducer. In this case, the connecting element is used to form a sound channel for the microphone. This channel connects the sound inlet in the upper part to the sound opening in the transducer element, the connecting element sealing the sound channel tightly from the rest of the internal volume of the housing. In this way, it is possible to use the rest of the internal volume of the housing as a back volume of the microphone, since because of the flip-chip mounting used it adjoins the active side of the transducer element.

The front volume is then formed in the sound channel and over the membrane, which constitutes the central part of the transducer element. With a connecting element which is formed by foaming of a plastic, by in-situ release of gas bubbles inside the softened (thermoplastic) material or still viscous uncured (thermosetting) plastic, the sound channel can be sealed in a straightforward way without entailing sealing problems due to production tolerances, which lead to different gap heights between the transducer element and the upper part, or without excessive compression being exerted on the transducer element by the seal in the event of closing of the housing by connection of the upper parts and the bottom part.

Thermoplastic material has a softening point $T_m$, beyond which the solid plastic is converted into a viscous state by heating.

Above a curing temperature, the thermoset enters a cross-linked and therefore harder state.

Furthermore, the connecting element comprises a plastic mixture which, besides the plastic, comprises a blowing agent that releases a gas at an expansion temperature $T_x$. The softening point and expansion temperature are preferably selected in such a way that the expansion temperature lies above the softening temperature. When a thermosetting plastic is used for the connecting element, the curing temperature lies above the expansion temperature. This ensures that, after the release of the gas bubbles from the blowing agent distributed in the plastic, the viscosity of the softened plastic opposes the expansion with only small forces. Preferably, however, at the same time the viscosity in the softened or still uncured state is set to be sufficiently high that significant flow of the plastic compound does not take place. This may ensure that the already soft or still viscous plastic does not enter the sound opening of the transducer, or even flow as far as the membrane. The latter would mean failure of the microphone.

A thermoplastic which is to some extent structurally stable in the event of softening and expansion also ensures that the geometry of the sound channel can be formed reproducibly. This also applies when using uncured thermosetting plastics.

So that a cavity housing can be formed from the upper part and the bottom part, at least one of these two housing parts is configured in the shape of a trough. The upper part and bottom part are preferably adhesively bonded with an adhesive, which at the same time seals the housing.

Designs consisting of a flat upper part and lower part with a frame arranged between them are also possible. A solder may then be used as the connecting medium.

In one embodiment, the transducer element is electrically and mechanically connected to the bottom part by means of a spring element. With the spring element, a further elastic or resilient suspension of the transducer element is achieved, which avoids an excessive influence of mechanical forces by the suspension and the sealing of the housing.

The spring element may have a spring constant which still sufficiently opposes force by the maximum occurring expansion pressure of the thermoplastic material mixture upon release of the gas bubbles. After the expansion of the thermoplastic material and the recooling, the plastic solidifies and in turn forms the elastic connecting element. Its thermomechanical properties may be set in such a way that the E modulus, i.e. the force which counteracts the compression of the connecting element, is approximately equal to the spring constant of the spring elements. It is, however, also possible to combine mutually different E moduli for the spring elements and connecting element.

The spring elements are preferably formed by microstructuring, and have first ends which are fastened on the bottom part, extend obliquely to the surface of the bottom part or are bent or guided away from the surface in another way, and have second ends which are arranged at a distance above the bottom part. The spring elements may be configured as leaf springs or coil springs. They may have bent or straight sections which are connected to one another while forming an angle. Preferably, the spring elements are bent in such a way that a first section fastened on the bottom part ultimately leads into a further section guided parallel thereto and separated from the bottom part.

The transducer element is then placed on the second ends of the spring elements and connected thereto, preferably by soldering.

In this case, both the forces acting vertically on the transducer element by tension and shear forces generated by lateral displacement are elastically damped.

In total, this results in at least four different embodiments A to D:

A. The connecting element is a thermoplastic and the connection of the transducer element to the bottom part comprises spring elements. This has the advantage that the connecting element does not need to have any special spring properties.

B. The connecting element is a thermoplastic and the connection of the transducer element to the bottom part is carried out without spring elements. Then, each time the softening temperature is exceeded, any stress is removed. For this reason, as in A, in this case as well the connecting element does not need to have any special spring properties.

C. The connecting element is a thermoset and the connection of the transducer element to the bottom part comprises spring elements. Then, here again, the connecting element does not need to have any special spring properties.

D. The connecting element is a thermoset and the connection of the transducer element to the bottom part does not comprise any spring elements. Here, although there is a risk of clamping the transducer element between the upper part and the bottom part, the spring property is generally sufficient because of the gas bubble fraction provided.

The transducer element itself is preferably a MEMS chip microstructured from a monocrystalline material with an integrated membrane and back electrode. The membrane is the moving part of the transducer element and reacts sensitively to stresses, which are minimized by the design according to the invention. The transducer characteristic results from the pressure-dependent capacitance between the rigid and mobile electrode.

The thermoplastic of the connecting element is selected in such a way that it has a favorable softening temperature. The blowing agent is preferably distributed homogeneously in the thermoplastic and preferably formed solidly and finely distributed, in order to minimize the size of the gas bubbles forming. The blowing agent may in this case consist of a salt which decomposes into gases. The blowing agent may also release volatile substances. The blowing agent may also be an emulsified viscous phase.

Ammonium salts, carbonates, carboxylic acids, anhydrides, peroxides or expandable graphite may be mentioned by way of example but without limitation. Expandable graphite furthermore has the advantage that the gas released remains fully bound in the graphite structure. This avoids the gas bubbles being able to rise from a low-viscosity softened thermoplastic mixture, or the relatively small gas bubbles formed combining to form larger gas bubbles and therefore cavities in the connecting medium.

The invention will be explained in more detail below with the aid of exemplary embodiments and the associated figures. The figures are given only schematically and not true to scale. They show cross sections in the production of a microphone according to the invention, or in the encapsulation of a transducer element during the production of a microphone.

Figure 1A:
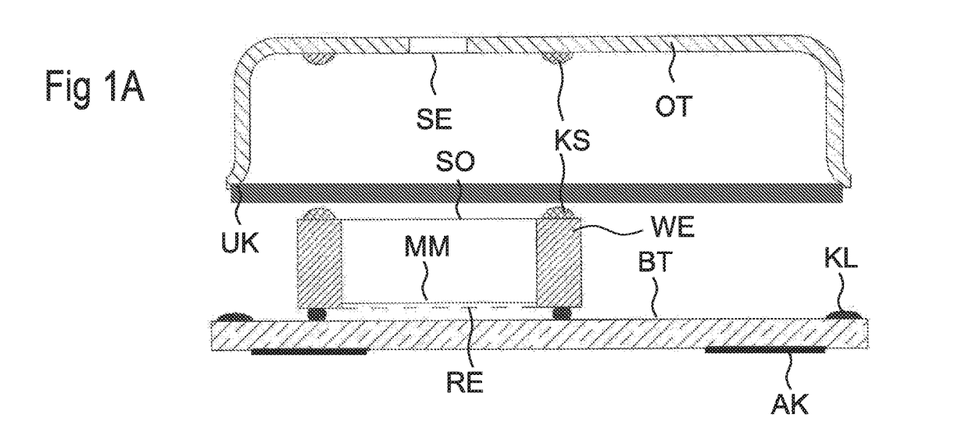
FIGS. 1A to 1C show various method stages according to a first method variant.

FIG. 1A shows the component parts of a microphone immediately before the sealing of the housing. In the embodiment represented, the bottom part BT is configured to be flat and comprises, for example, a ceramic platelet. The bottom part BT may furthermore have a multilayer structure in which structured conductive tracks are arranged between the individual layers, these tracks constituting at least a further wiring plane for interconnection of the microphone component parts, or for connection of the microphone component parts to outer contacts AK on the lower side of the bottom part BT.

The transducer element WE itself is soldered onto the bottom part BT, either onto flat metal contacts or directly onto the upper opening of a via.

By means of the electrical and mechanical connection, which is produced with the solder point, the membrane MM and the back electrode RE are connected to the bottom part BT and furthermore to the outer contacts AK or another chip component (not represented in the figure) inside the housing.

The second housing part, here the upper part OT, is configured in the shape of a cap and consists, for example, of a deep-drawn metal cap. It may, however, also comprise other materials or be constructed in a multilayer fashion. A sound inlet SE in the form of one or more openings is provided on the upper side of the upper part OT.

A structured adhesive layer KL, onto which the lower edge UK of the upper part OT may be fitted, is applied on the upper side of the bottom part BT.

Furthermore, a thermoplastic material mixture KS is applied in structured form either only on the upper side of the transducer element WE, only on the inner side of the upper part OT, or both on the inner side of the upper part and on the upper side of the transducer element. This mixture is structured in such a way that it annularly encloses either the sound opening SO on the transducer element or the sound inlet SE on the upper part OT, or both.

The upper part is then fitted with its lower edge UK onto the adhesive layer KL and adhesively bonded. The adhesive preferably cures to form a thermoset and forms a thermally stable adhesive bond KV. If a thermal curing is carried out in this case, it is advantageous for the temperature to remain below the expansion temperature $T_X$ during this.

Figure 1B:
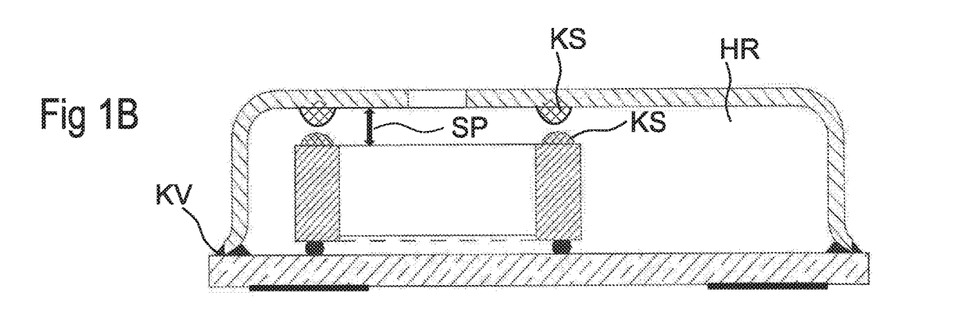

After the placement and connection of the upper part and the bottom part, the sound inlet SE and the sound opening SO are preferably arranged concentrically above one another. The sound inlet SE may also be arranged in the sound opening SO with a central offset. If the plastic is applied onto the two surfaces facing one another, the two structures of thermoplastic material face one another directly. FIG. 1B shows the arrangement at this method stage.

In a subsequent method step, the entire arrangement is heated initially to the softening temperature $T_m$ of the thermoplastic material and subsequently further to the expansion temperature $T_X$ of the blowing agent finely distributed in the thermoplastic material compound. Once the expansion temperature is reached or exceeded, a gas or a volatile compound is released from the blowing agent and leads to expansion of the thermoplastic material mixture, which opposes little forces to the expansion because of the viscous structure after melting. Because of the volume increase, the plastic KS then bridges the gap SP, but without exerting significant forces on the transducer element.

Figure 1C:
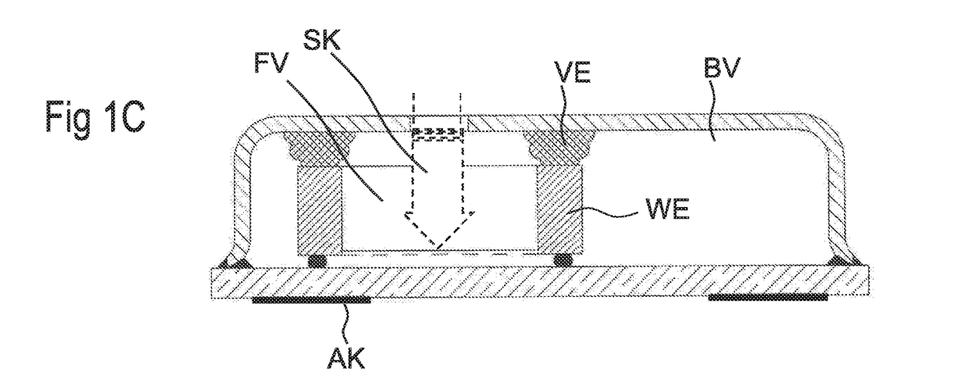

In the next step, the entire component is cooled again to below the softening temperature $T_m$ of the thermoplastic material. The connecting element VE, or the thermoplastic material, then solidifies again and encloses the gas bubbles firmly and positionally stably, and an elastically compressible seal is formed, which at the same time is used as the connecting element VE.

The effect of the expansion is that the connecting element VE formed after cooling and resolidification of the plastic bears on both sides on the inner face of the upper part OT and on the upper side of the transducer element WE, and therefore provides an acoustic connection of the transducer element to the surroundings. Because the plastic compound KS applied in a structured fashion already annularly encloses the sound opening SO or the sound inlet SE, or both, the connecting element now also annularly encloses these two openings and seals them in its entire extent from the upper part and the transducer element. FIG. 1C shows the component at this method stage.

In this case, a defined sound channel is formed from outside the microphone, through the sound inlet SE and through the connecting element VE, into the sound opening of the microphone, and is sealed from the rest of the internal volume of the housing with the aid of the connecting element. While the front volume is defined between the upper part OT and the membrane MM of the transducer element, the back volume BV is formed by the entire free remaining volume between the upper part OT and the bottom part BT (without the transducer element). The back volume BV that can be set may be selected relatively large, so that the microphone can be operated with a sufficient dynamic range and sensitivity.

Figure 2A:
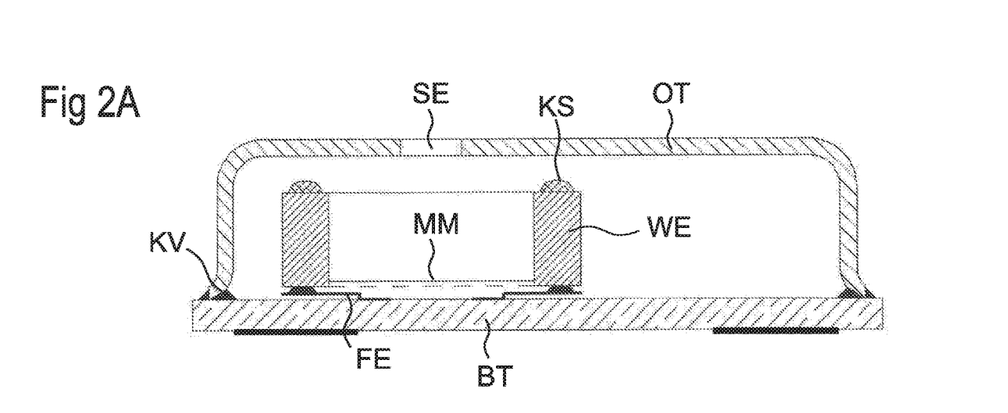
FIGS. 2A to 2C show various method stages according to a second method variant.

FIG. 2A shows a method stage during the encapsulation according to the second encapsulation variant. In this case, the transducer element WE is placed on spring elements and soldered thereto. The spring elements are structured on the upper side of the bottom part BT. The spring elements FE are anchored with one end on the bottom part and arranged at a short distance therefrom with the other end. After the soldering of the transducer element, the latter is suspended pliably relative to the bottom part. Here again, the upper part may in turn be adhesively bonded to the bottom part, so that an internal volume of the cavity housing is enclosed.

Figure 2B:
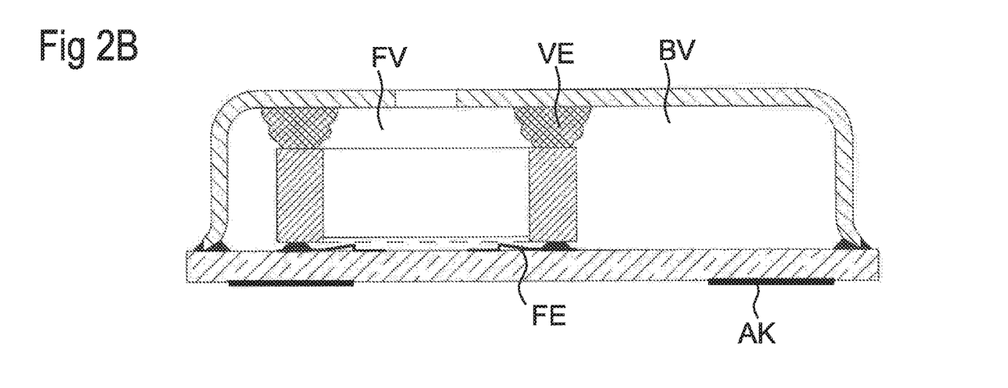

FIG. 2B shows the arrangement after heating of the arrangement above the softening temperature of the thermoplastic and above the expansion temperature of the blowing agent. This leads to swelling of the volume of the plastic mixture applied in a structured fashion. Because of the expansion, the gap formed between the upper side of the transducer element WE and the lower side of the upper part OT is closed fully by the expanded plastic mixture. The annularly structured application makes it possible to form a connecting element which bears tightly against the transducer element and the upper part along its entire circumference and can thus fulfil the function of a sealing ring.

In FIG. 2B, it is furthermore represented that the forces acting on the transducer element because of the expansion of the thermoplastic may exceed the spring force of the spring element, the two ends of the latter being pressed against the bottom plate. Nevertheless, the spring elements can still absorb tangential forces in this compressed state.

FIG. 2B represents a possible final stage of a microphone encapsulated according to the invention. It is, however, also possible after a certain waiting time to achieve relaxation of the spring elements, in which they deform back into their original starting position. The still soft and viscous plastic mixture in this case yields laterally and thus correspondingly reduces the pressure of the spring elements in its vertical extent.

Figure 2C:
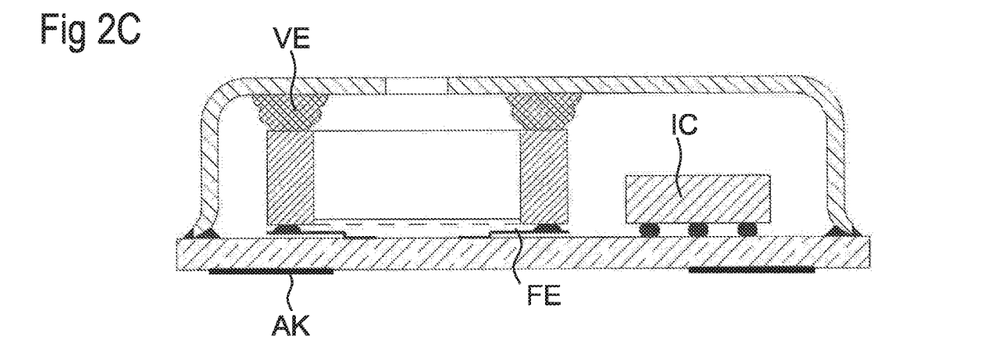

FIG. 2C shows an arrangement with the connecting element VE which is formed from resolidified thermoplastic material mixture and rerelaxed spring elements. Furthermore, FIG. 2C shows by way of example another component part arranged inside the housing, for example an integrated circuit IC in the form of an ASIC chip. This may likewise be soldered on the bottom part, for example by means of bumps. It is, however, also possible to adhesively bond the component part IC and connect it via bonding wires to corresponding contacts on the bottom part.

The transducer element WE, on the other hand, is electrically and mechanically connected to the bottom part BT only via the spring elements.

The outer contacts of the component on the lower side of the bottom part are used for connecting the microphone to a circuit environment. The interconnection of the component part IC to the transducer element WE may be configured via a wiring plane inside the bottom part, so that a smaller number of outer contacts is required than if each of the connections of the component part IC was separately fed out by itself and only connected to the terminals of the transducer element outside.

The method according to the invention has the advantage that the two connecting processes between the upper part and the bottom part and between the transducer element and the upper part are decoupled in terms of time and temperature. The sealing of the gap by the connecting element is not carried out until the mounting of the upper part on the bottom part has been completed. The two processes are also thermally decoupled, since the expansion of the elastic plastic mixture is not carried out until there is a temperature which must not yet have been exceeded previously during the mounting of the other component parts. A selected curing temperature $T_c$ for the curing of the adhesive bond between the upper part and the bottom part therefore occurs below the softening temperature of the thermoplastic, and also below the melting temperature of the solder bump with which the transducer element WE and optionally other component parts EC are soldered on the bottom part.

In this way, it is possible to ensure that the curing of the adhesive of the adhesive bond KV, by means of which the two housing parts are adhesively bonded to one another, and the sealing by the connecting element, are clearly delimited from one another in terms of time and thermally. The two processes may be optimized and carried out separately from one another.

The gas bubbles released create a foam structure, which generates only minor stresses in the resolidified connecting element VE. Because the thermoplastic is in the soft and therefore viscous state during the connecting process and foaming, a pressure acting because of the expansion vertically against the upper part and the transducer element can relax again with a further waiting time, since the viscous compound can yield sideward. Because of the volume increase of the thermoplastic material mixture, reliable and durable sealing of the gap between the transducer element and the upper part takes place. Only minor forces are transmitted onto the transducer element, and also when spring elements are used they can return into their resting position. In particular, the solder connection itself does not experience any unacceptable deformation during subsequent remelting, since it is always the case that the thermoplastic material softens earlier, yields to the pressure and resolidifies after relaxation.

In order to prevent the gas bubbles emerging from the plastic compound in the viscous state or coalescing, solid or encapsulated blowing agents are preferred. The aforementioned expandable graphite is particularly preferred. In this, volatile compounds are incorporated between the crystal planes, which push the planes apart from one another during heating and thus lead to swelling of the expandable graphite by factors of several hundred. For this reason, a relatively small proportion of this blowing agent in the plastic mixture is required.

The starting temperature for the release of the gas (expansion temperature) may be selected in the range of from about 150 to 300 degrees Celsius by suitable choice of the outgassing components. In this way, it is possible to match the required temperature conditions or temperature properties of the different materials of the microphone to one another.

Typically, the height of the gap to be sealed between the upper part and the transducer element is about 50 to 500 µm. This may be bridged with structures of thermoplastic material mixture applied on one or both sides in a respective height of about 5 to 200 µm thickness (before the expansion), a thickness expansion ratio of from 1:2 to 1:10 being favorable. It is, however, also possible to set thickness expansion ratios of up to about 1:50.

The bottom part may, as mentioned, have a multilayer structure and correspondingly comprise a multilayer circuit. The layer material of this monolayer or multilayer bottom part is organic- or ceramic-based. The upper part may consist of polymers, ceramics, or in particular metal.

Figure 3:
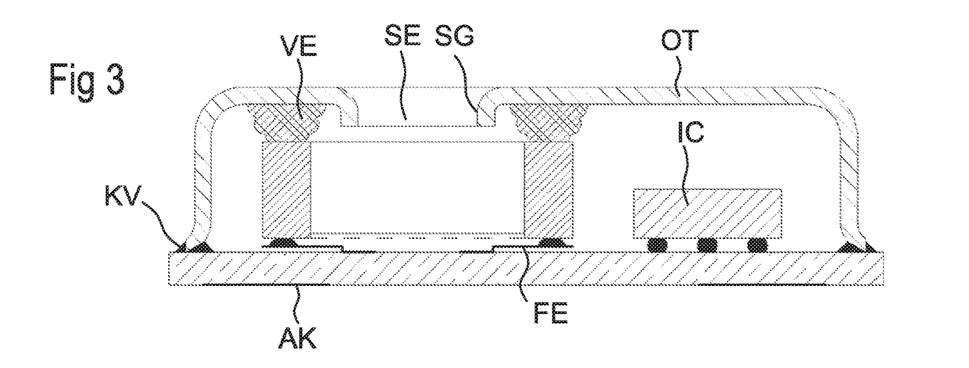
FIG. 3 shows a microphone according to another embodiment.

FIG. 3 shows an embodiment of the microphone with which penetration of the plastic compound of the connecting element VE into the sound inlet SE can be prevented during the foaming. To this end, the upper part OT has an edge drawn inwardly/lowered downward around the sound inlet SE. To this end, the upper part may for example be made of metal and have an inwardly/downwardly bent burr SG. The latter may be easily produced by a corresponding stamping or embossing tool during manufacture of the upper part, for example from a sheet metal.

As a result, the lateral extent of the plastic compound of the connecting element VE is limited inwardly toward the sound inlet SE during the foaming.

Figure 4:
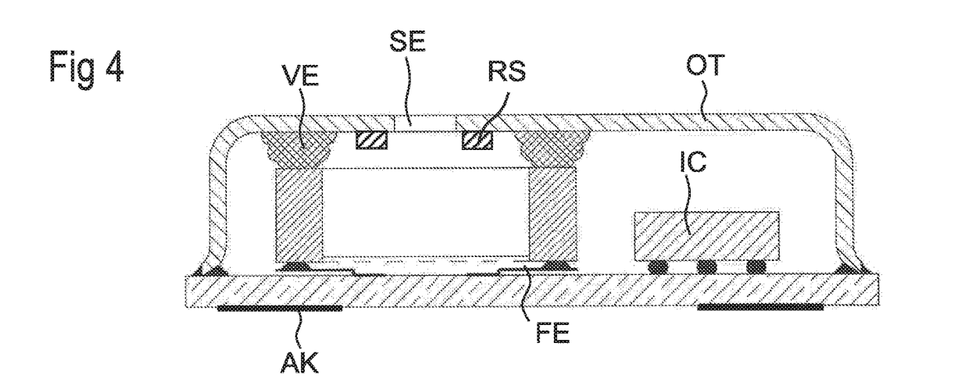
FIG. 4 shows a microphone according to yet another embodiment.

FIG. 4 shows another embodiment of the microphone, with which entry of the plastic compound of the connecting element VE into the sound inlet SE can likewise be prevented during the foaming. To this end, an annular stub RS is molded, or fastened in another way, for example by adhesive bonding or soldering, internally on the upper part around the sound inlet SE. The annular stub RS may consist of the same material as the upper part OT or comprise a different material. The annular stub RS may be flush with the sound inlet SE or, as represented, also have a somewhat larger internal diameter than the sound inlet SE. A larger tolerance is therefore possible when applying the stub.

In the two embodiments according to FIGS. 3 and 4, the height of the burr SG or of the annular stub is less than the intended or remaining gap between the lower side of the upper part OT and the upper side of the transducer element WE, so that the respective element SG or RS has no further effects on the production and function of the microphone.

The invention is described only with the aid of a few exemplary embodiments, and is therefore not restricted to the specific examples. The sealing achieved according to the invention between the transducer element and the upper part is not restricted to particular materials, and is determined only by the properties of the thermoplastic material compound, i.e. of the thermoplastic and the blowing agent contained therein. The required core temperatures may be varied within a certain scope and optimized to the requirements, or to the overall processing operation. As a result, a tightly encapsulated microphone is obtained with good temperature stability and with a high dynamic range.

LIST OF REFERENCES

AK outer contacts of the microphone
BT bottom part
BV back volume
FE spring element
FV front volume
HR cavity inside the housing
KL structured adhesive layer
KS thermoplastic mixture applied in a structured fashion
KV adhesive bond between upper part and bottom part
MM membrane
OT upper part
RE back electrode
RS annular stub
SE sound inlet in the upper part to the
SG burr
SK sound channel, connects
SO sound opening of the transducer
SP gap between housing and transducer element
$T_M$ softening temperature of the thermoplastic mixture
$T_X$ expansion temperature of the blowing agent
UK lower edge of upper part
VE elastic connecting element consisting of foamed thermoplastic material, blowing agent and included gas bubbles
WE transducer element in the housing

The invention claimed is:

1. A microphone,
having a housing, which comprises a bottom part and an upper part
having a transducer element, which is arranged in the housing and is electrically and mechanically connected to the bottom part,
having a flexible connecting element, which is pliable and/or compressible, is arranged between the transducer element and the upper part, and bears on the transducer element and on the upper part,
wherein the connecting element comprises a plastic in which gas bubbles due to foaming are distributed,
wherein the gas bubbles comprise a volume fraction of between 50 and 98% in the connecting element,
wherein the foaming is carried out first in the housing, so that the connecting element bears compression-free and tightly on the transducer element and upper part.

2. The microphone according to claim 1,
wherein a sound inlet is provided in the upper part,
wherein a sound opening is provided in the transducer,
wherein the connecting element seals a sound channel, which connects the sound inlet to the sound opening, from the rest of the internal volume of the housing.

3. The microphone according to claim 2,
wherein the thermoplastic material has a softening point TM,
wherein the connecting element comprises a blowing agent, which releases a gas at an expansion temperature TX,
wherein TM<TX.

4. The microphone according to claim 2,
wherein one of the upper part and the bottom part is configured in the shape of a trough,
wherein the upper part is adhesively bonded onto the bottom part with an adhesive.

5. The microphone according to claim 1,
wherein the plastic of the connecting element is selected from
c) a thermoplastic having a softening temperature of between 100 and 220° C. and
d) a thermoset having a thermal expansion coefficient of less than or equal to 300 ppm/K at room temperature.

6. The microphone according to claim 1,
wherein the thermoplastic material has a softening point TM,
wherein the connecting element comprises a blowing agent, which releases a gas at an expansion temperature TX,
wherein TM<TX.

7. The microphone according to claim 6,
wherein the blowing agent contained in the thermoplastic of the connecting element is selected from an ammonium salt, a carbonate, a carboxylic acid, an anhydride, a peroxide and an expandable graphite.

8. The microphone according to claim 1,
wherein one of the upper part and the bottom part is configured in the shape of a trough,
wherein the upper part is adhesively bonded onto the bottom part with an adhesive.

9. The microphone according to claim 1, having a spring element, by means of which the transducer element is electrically and mechanically connected to the bottom part.

10. The microphone according to claim 9,
wherein the blowing agent contained in the thermoplastic of the connecting element is selected from an ammonium salt, a carbonate, a carboxylic acid, an anhydride, a peroxide and an expandable graphite.

11. The microphone according to claim 9,
wherein the transducer element is soldered with its terminals pointing downward toward the bottom part onto the spring elements.

12. The microphone according to claim 11,
wherein the transducer element is a MEMS chip microstructured from a monocrystalline material with an integrated membrane and back electrode,
wherein the transducer element is mounted stress-free and elastically between the bottom part together with the spring element and the upper part together with the connecting element.

13. The microphone according to claim 11,
wherein the blowing agent contained in the thermoplastic of the connecting element is selected from an ammonium salt, a carbonate, a carboxylic acid, an anhydride, a peroxide and an expandable graphite.

14. The microphone according to claim 9,
wherein the transducer element is a MEMS chip microstructured from a monocrystalline material with an integrated membrane and back electrode,
wherein the transducer element is mounted stress-free and elastically between the bottom part together with the spring element and the upper part together with the connecting element.

15. A method for encapsulating a transducer element for a microphone,
wherein a bottom part and an upper part are provided for a housing surrounding a cavity,
wherein spring elements are provided inside the bottom part,
wherein the transducer element is soldered onto the spring elements at a distance from the bottom part,
wherein a thermoplastic mixture, which comprises a blowing agent that thermally releases a gas, is applied in a structured way and/or in a defined quantity on the top on the transducer element and/or internally on the upper part,
wherein the upper part is mounted on the bottom part in such a way that the transducer element is enclosed in an inner cavity of the housing,
wherein the dimensions of the transducer element and of the internal space of the housing, the distance of the transducer element from the bottom part and the height of the structured thermoplastic mixture are dimensioned in such a way that a gap remains between the housing and the transducer element above the thermoplastic mixture,
wherein the entire arrangement is heated to a softening temperature TM of the thermoplastic mixture, at which the mixture becomes viscous,
wherein further heating is carried out to the expansion temperature TX of the blowing agent, a gas being released from the blowing agent, which leads to an expansion of the viscous mixture so that the viscous expanded mixture seals the gap,
wherein cooling is carried out back to the softening temperature TM, so that the expanded mixture solidifies and forms a solid connecting medium.

16. The method according to claim 15,
wherein metallic leaf or coil springs are provided as spring contacts, first ends of which are fastened on the bottom part, which extend straight or curved, and have a section which extends parallel to and at a distance from the surface of the bottom part, so that their second ends are arranged at a distance from the bottom part,
wherein the upper part has a sound inlet and the transducer element has a sound opening,
wherein the thermoplastic mixture is applied in a structured fashion around the sound inlet on the upper part and/or around the sound opening on the transducer element,
wherein the connecting medium seals a sound channel, which leads from the sound inlet to the sound opening, from the rest of the internal volume of the housing.

17. The method according to claim 15,
wherein the amount of blowing agent in the thermoplastic mixture is dimensioned in such a way that a thickness increase by a factor of from 2 to 10 can take place after during the expansion.

18. The method according to claim 17,
wherein the layer thickness of the thermoplastic mixture is dimensioned in such a way that, with a given factor of thickness expansion, a gap of from 50 to 500 µm can be closed.

19. The method according to one of claim 15,
wherein the connecting of the upper and bottom parts is carried out by means of an adhesive,
wherein the softening temperature TM and the expansion temperature TX of the thermoplastic mixture are selected in such a way that both temperatures lie above the allowable ambient temperature, above the curing temperature of the adhesive, but below the melting temperature of the solder.

20. The method according to one of claim 15,
wherein the bottom part comprises upwardly facing spring elements,
wherein the bottom part comprises outer electrodes arranged on the lower side, by means of which electrodes the microphone can be electrically connected,
wherein the second ends of the spring elements have a distance from the bottom part in the resting position,
wherein the transducer element is soldered onto the second ends of the spring elements.

* * * * *